United States Patent
Parekh et al.

(10) Patent No.: US 8,032,884 B2
(45) Date of Patent: Oct. 4, 2011

(54) THREAD HAND OFF

(75) Inventors: Harshadrai Parekh, San Jose, CA (US); Colin Edward Honess, San Rafael, CA (US); Douglas V. Larson, Santa Clara, CA (US); Swapneel Kekre, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1373 days.

(21) Appl. No.: 11/555,229

(22) Filed: Oct. 31, 2006

(65) Prior Publication Data

US 2008/0104593 A1    May 1, 2008

(51) Int. Cl.
*G06F 9/46* (2006.01)
(52) U.S. Cl. .................. 718/100; 718/102; 718/104
(58) Field of Classification Search .......... None
See application file for complete search history.

(56) References Cited

U.S. PATENT DOCUMENTS

| | | | | |
|---|---|---|---|---|
| 5,159,686 A | * | 10/1992 | Chastain et al. | 718/105 |
| 6,289,369 B1 | * | 9/2001 | Sundaresan | 718/103 |
| 6,360,243 B1 | * | 3/2002 | Lindsley et al. | 718/103 |
| 6,769,017 B1 | * | 7/2004 | Bhat et al. | 709/214 |
| 2003/0208521 A1 | * | 11/2003 | Brenner et al. | 709/103 |
| 2005/0210472 A1 | * | 9/2005 | Accapadi et al. | 718/105 |

* cited by examiner

*Primary Examiner* — Meng An
*Assistant Examiner* — Caroline Arcos (57) ABSTRACT

Systems, methods, and devices, including computer executable instructions for transferring threads are described. The method comprises determining an idle processor by checking a handoff state of the processor prior to placing an identified runnable thread in a run queue of an idle processor. The method also comprises transferring the runnable thread to a determined idle processor by setting the handoff state of the processor to a handle of the runnable thread.

18 Claims, 7 Drawing Sheets

FIG. 8C

THREAD HAND OFF

BACKGROUND

Multiprocessor devices comprise two or more processors executing processes, i.e., processor executable instructions, in combination. Executing processes comprise all or a portion of operating systems, application programs, device drivers, etc. Processor executable instructions may be provided in the form of one or more threads for execution by the processor. In multiprocessor devices, threads may be allocated to a processor for execution in various manners. For example, particular thread types may be assigned to a particular processor. Additionally, a number of threads from an application program or that provide a particular function may be assigned to the same processor for execution. The threads may also be assigned to one of a number of processors.

A process is a container for a set of instructions that carry out all or a portion of the overall task of an application program. Processes comprise executing application programs, managed by operating system components such as a scheduler and a memory management program. A process context comprises the executable instructions, data (used by the executable instructions), and stack (memory used when the process is running). A process is a representation of an executing application program and a thread is a fraction of the program. A thread is a sequence of executing instructions of a program. A particular type of thread is a kernel thread. Kernel threads exist within the context of a process and provide the operating system the means to address and execute smaller segments of the process. Threads allow application programs to be broken up into logically distinct tasks. Each thread can be scheduled, synchronized, and prioritized with respect to one or more threads on one or more processors.

When a thread becomes ready for execution by a processor it is said to be a "runnable" thread. The scheduler places the runnable thread on a run queue. The target run queue selection for the runnable thread is performed based on thread scheduling parameters such as scheduling policy, scheduling priority, and processor or non uniform memory access (NUMA) affinity, as well as scheduler run queue structuring. The thread is then placed on the run queue after acquiring a lock for synchronization, i.e., a run queue lock. When a processor becomes available to execute a thread, the processor selects a thread from a run queue, removes the selected thread from the run queue, and executes the thread. The act of removing the thread from the run queue involves acquiring the run queue lock. This mechanism of using run queues to manage runnable threads may face several performance throughput issues on systems having idle processors.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Embodiments comprise systems, methods, and devices, comprising computer executable instructions for transferring threads. At least one embodiment comprises a computing system comprising a number of processors (each of the processors comprising a local run queue mechanism), a memory in communication with at least one of the number of processors, and a scheduler in communication with at least one of the number of processors. The scheduler comprises a run queue mechanism. Computer executable instructions are storable in memory and are executable on at least one of the number of processors to identify a runnable thread received by the scheduler, identify an idle processor among the number of processors, and transfer the runnable thread to the idle processor bypassing an existing local run queue of the processor.

In some embodiments, the computer executable instructions comprise instructions executable to maintain a per-processor variable which comprises a number of values for a number of states associated with an idle transfer mechanism. The instructions execute to change a value of a state associated with the idle transfer mechanism to a ready state when a processor enters an idle loop. The instructions also execute to change the value of the state associated with the idle transfer mechanism to a not ready state when the processor starts executing a thread.

If an idle processor is not identified to facilitate a direct hand off, instructions execute to place the runnable thread in the local run queue. When an idle processor enters an idle loop, the instructions execute to have the idle processor first check the value of the state associated with the idle hand off mechanism to determine if a runnable thread is being directly transferred, e.g., handed off, to the idle processor by an idle hand off mechanism. If the value of the state associated with the idle hand off mechanism remains a ready state, the instructions execute to have the idle processor begin looking for runnable threads in a run queue.

Figure 3:
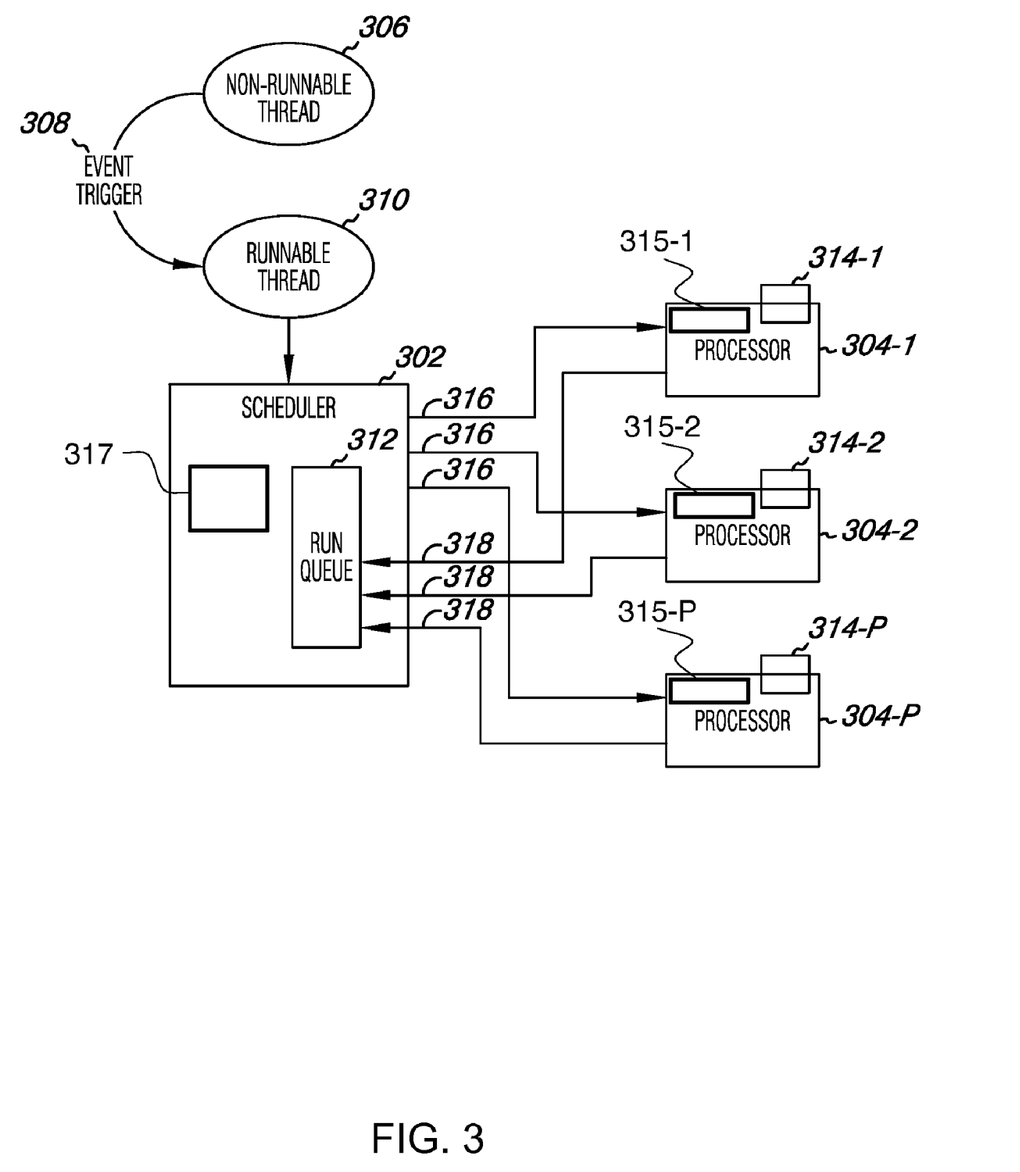
FIG. 3 is a high level functional block diagram of an embodiment for bypassing a run queue mechanism.

FIG. 3 depicts a high level functional block diagram of an embodiment for bypassing a run queue mechanism in a multiprocessor computing system 300. FIG. 3 depicts a portion of computing system 300 comprising a scheduler 302. In some embodiments, scheduler 302 is associated with a particular operating system on computing system 300 Scheduler 302 is communicatively coupled with a number of processors 304-1, 304-2, ..., 304-P of the multiprocessor computing system 300. The designator "P" is used to indicate that a number of processors may be available to a particular multiprocessor system. For clarity and simplification of the description, a single processor 304 is discussed even though more than one processor may exist. In some embodiments, computing system 300 may comprise a greater or lesser number of processors.

Execution of a program, e.g., a set of executable instructions, by processor 304 may cause the creation of a process with one or more threads. In some embodiments, processor 304 executing a program causes the generation of a single thread and in some other embodiments, the processor executing the program causes the generation of two or more threads. Processor 304 executes the generated thread comprising a set of instructions of the program. Threads in an executable, or "runnable", state are those threads ready to be executed by a processor, e.g., an available processor from among processors 304-1, 304-2, . . . , 304-P. A number of events may cause an executing thread to transition to a non-runnable thread state 306. Likewise, various events, e.g., 308, may cause the transition of a thread from a non-runnable thread state 306 to a runnable thread state 310.

Each processor 304 comprises a local run queue 314 and a handoff state variable 315. Each processor local run queue, e.g., 314-1, 314-2, . . . , 314-P, represents a local run queue to that particular processor. Runnable threads awaiting execution by processor 304 may be stored in local run queue 314. Processor 304 checks local run queue 314 and global run queue 312 for a runnable thread to be executed by the processor. In some embodiments, processor 304 checks global run queue 312 before checking local run queue 314. Processor 304 checks the run queues 312, 314 during execution of scheduler instructions. In some embodiments, whether the thread is allocated to the global or local run queue depends on the scheduling parameters of the thread.

Figure 7:
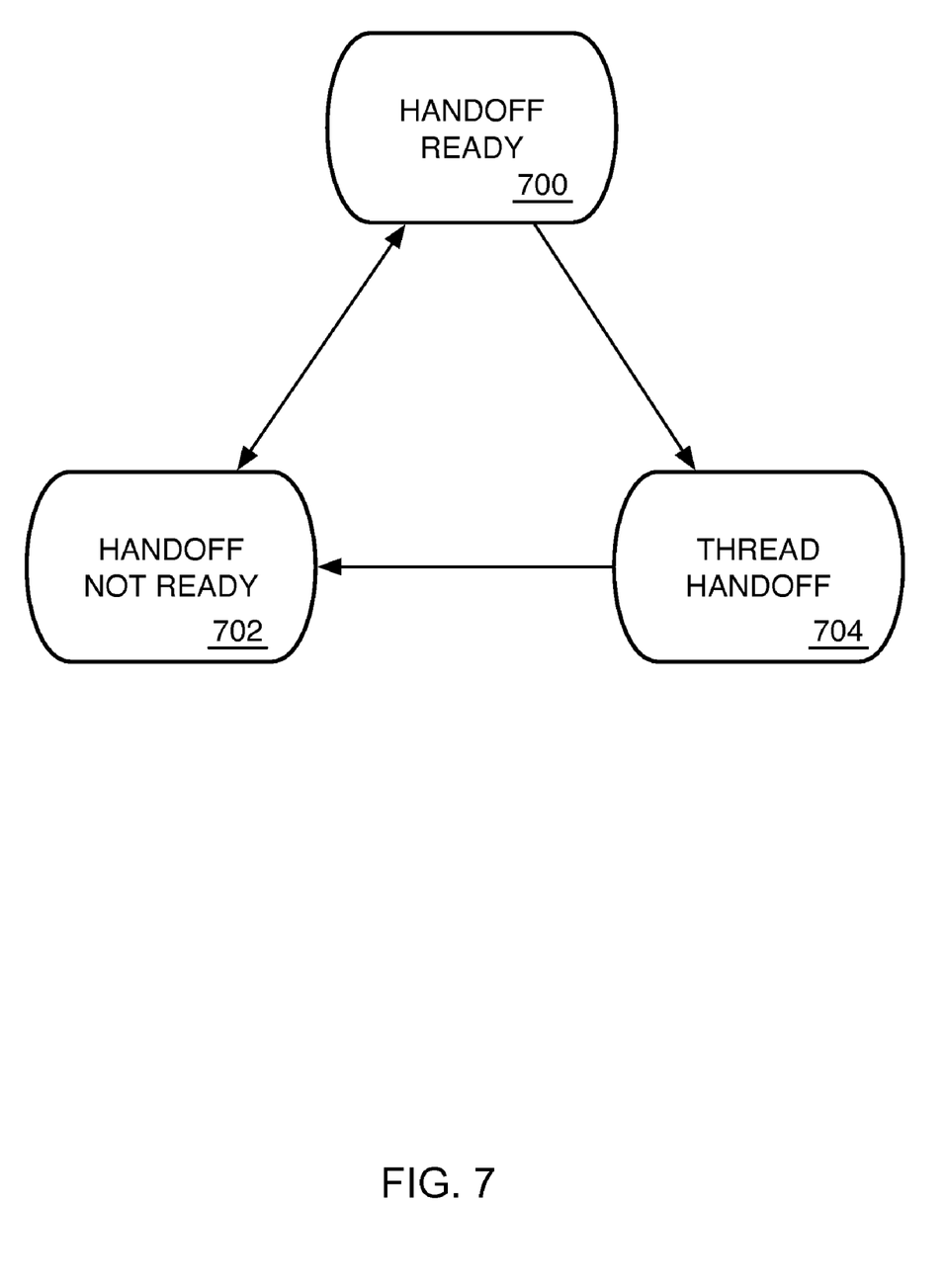
FIG. 7 is a state diagram of a variable according to an embodiment.

Handoff state variable 315 comprises an indicator representing the status of processor 304. Handoff state variable 315 comprises three states as depicted in FIG. 7: a handoff ready state 700, a handoff not ready state 702, and a thread handoff state 704. If processor 304 is ready to receive a runnable thread, e.g., the processor is in an idle state, from scheduler 302, the processor sets handoff state variable 315 to indicate a handoff ready state 700. If processor 304 is not ready to receive a runnable thread from scheduler 302, the processor sets handoff state variable 315 to indicate a handoff not ready state 702. If the handoff state variable 315 is set to another value (i.e., a thread handoff state 704, not a handoff ready state 700 and not a handoff not ready state 702) the handoff state variable value represents the handle of a thread to be executed by processor 304. The thread handle is a representation of an identifier for the runnable thread, e.g., a memory address of the kernel data structure representing the particular thread, a thread identifier of the particular thread, etc. Scheduler 302 sets the handoff state variable 315 value to the thread handoff state 704.

Figure 8A:
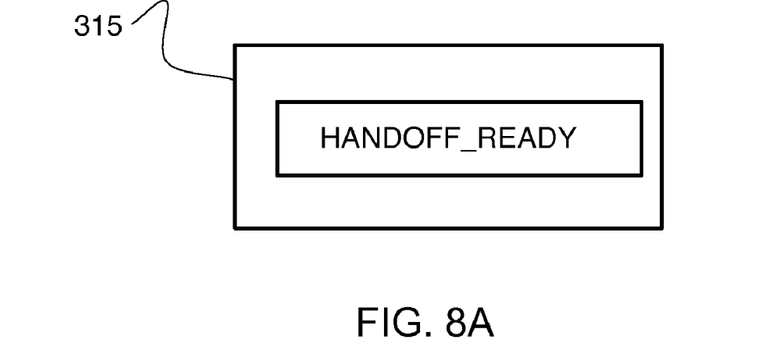
FIGS. 8A-8C are high level diagrams of a variable according to another embodiment.
Figure 8B:
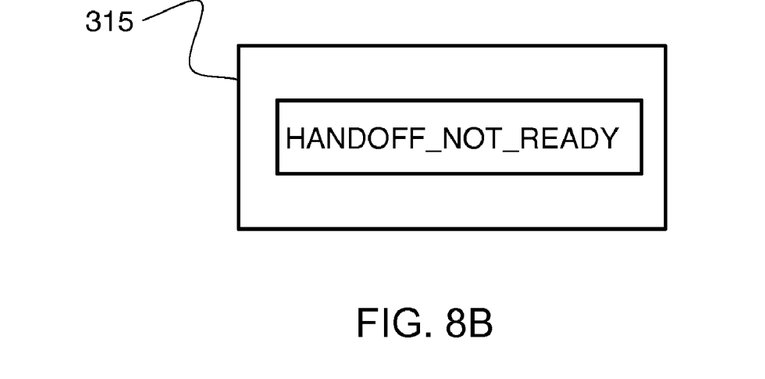
Figure 8C:
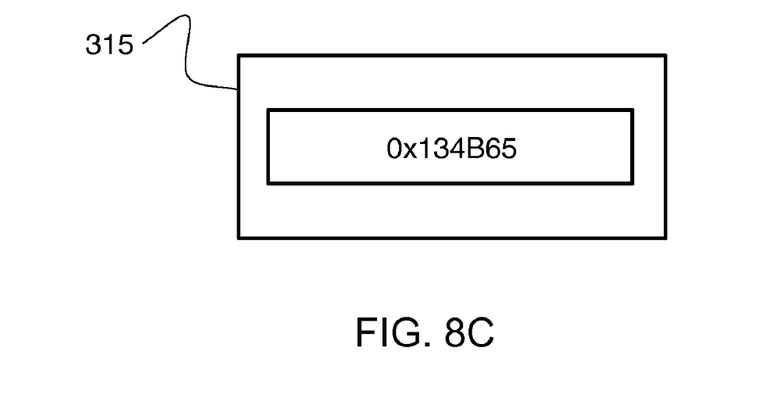

FIGS. 8A-8C depict another embodiment in which handoff state variable 315 comprises a HANDOFF_READY value (FIG. 8A) indicating a processor in a handoff ready state, a HANDOFF_NOT_READY value (FIG. 8B) indicating the processor in a handoff not ready state, and a thread handle value (FIG. 8C) indicating the allocation of a runnable thread to a processor in a handoff ready state.

Each processor 304-1, 304-2, . . . , 304-P sets the value of the handoff state variable 315 based on the status of the individual processor. In some embodiments, processor 304 atomically changes the value of the handoff state variable 315, i.e., the processor changes the handoff state variable in a single operation. Atomically setting the handoff state variable 315 prevents invalid states based on timing of the access of the state variable value, e.g., by processor 304 and scheduler 302. Each processor 304 sets the handoff state variable 315 to the handoff ready state upon entering an idle loop, e.g., beginning to check for runnable threads in run queues 314 and 312. In some embodiments, scheduler 302 atomically sets the handoff state variable 315 value to the thread handoff state 704.

Processor 304 checks the status of handoff state variable 315 value during execution of an idle state in which the processor checks the run queues, e.g., 314 and 312, for a runnable thread. In some embodiments, processor 304 periodically checks the handoff state variable 315 value during looping in an idle state. If processor 304 determines that handoff state variable 315 value has changed to a thread handoff state, i.e., a state other than a handoff ready state or a handoff not ready state, the processor determines that a thread handoff has occurred and begins execution of the thread whose handle has been placed in handoff variable state 315. If processor 304 determines that handoff state variable 315 value is a handoff ready state, the processor continues checking for a runnable thread on run queues 314 and 312.

If processor 304 determines that handoff state variable 315 value is in a thread handoff state and the processor had begun selecting another thread for execution from a run queue 312 or 314, the processor selects a thread for execution based on a scheduling priority of the runnable threads. If the thread whose handle had been placed in the handoff state variable 315 is not selected for execution, the processor returns the unselected thread, i.e., the thread whose handle had been placed in the handoff state variable, to a run queue 312, 314, e.g., an appropriate run queue based on one or more scheduling parameters, for a processor 304 to remove from the run queue for execution. In some embodiments, processor 304 determines whether to return the unselected thread to a run queue 312, 314 based on one or more scheduling parameters of the thread.

Scheduler 302 comprises a global run queue 312 and an idle handoff mechanism 317. Scheduler run queue 312 represents a global run queue from which scheduler 302 allocates runnable threads to processors 304-1, 304-2, . . . , 304-P. Execution of idle hand off mechanism 317, e.g., a set of executable instructions, causes scheduler 302 to first look for an idle processor after a thread becomes ready to run, e.g., a thread transitions to runnable thread state 310. For example, after a thread transitions to a runnable thread state 310, scheduler 302 checks the state of handoff state variable 315 of each processor 304-1, 304-2, . . . , 304-P for a processor in a handoff ready state, e.g., handoff ready state 700. After determining that at least one processor 304 is in a handoff ready state, scheduler 302 sets the handoff state variable 315 value of the particular processor to the handle of the runnable thread being allocated.

As depicted by arrows 316 in FIG. 3, when a thread transitions to a runnable thread state 310, scheduler 302 looks for an eligible processor 304-1, 304-2, . . . , 304-P, and, if available, hands this thread off to that processor 304-1, 304-2, . . . , 304-P by setting the handoff state variable 315 of the processor to the value of the thread handle of the runnable thread being allocated. If no available processor is found, then scheduler 302 places the runnable thread on the scheduler run queue 312 or on a local run queue 314.

When a processor from among processors 304-1, 304-2, . . . , 304-P enters an idle loop, e.g., becomes available, the executable instructions associated with the idle hand off mechanism 317 cause the processor from among processors 304-1, 304-2, . . . , 304-P to check whether it is receiving a runnable thread directly from scheduler 302, i.e., the processor checks the status of handoff state variable 315 to determine if the value is neither indicative of a handoff ready state nor a handoff not ready state. If an idle processor 304-1, 304-2, . . . , 304-P is not receiving a runnable thread directly form the scheduler 302, the idle processor checks the various run queues, e.g., 312 and 314-1, 314-2, . . . , 314-P, to look for runnable threads, e.g., looping in an idle state looking for runnable threads on the scheduler run queue 312 as indicated by arrows 318. In some embodiments, idle hand off mechanism 317 may improve the performance throughput for application workloads that are processor intensive over short bursts and/or have a high context switching frequency.

Figure 4:
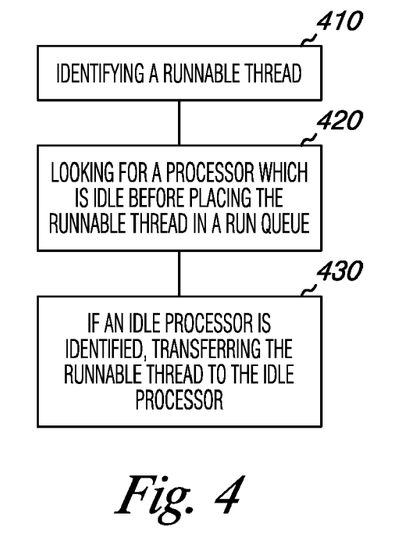
FIG. 4 is a process flow diagram of transferring threads according to an embodiment.

FIG. 4 depicts a method embodiment for transferring threads. As depicted in FIG. 4, the method comprises identifying a runnable thread, as shown at 410. Identifying a runnable thread comprises a scheduler identifying a thread transitioning from a non runnable state 306 to a runnable state 310 (FIG. 3). The method further comprises looking for a processor which is idle before placing the runnable thread in a run queue, as shown at 420. Looking for a processor which is idle 420 comprises executing instructions associated with an idle hand off mechanism 317 to determine an idle processor from a number of processors using a processor search algorithm. The method further comprises transferring the runnable thread to the idle processor when an idle processor is identified, as shown at 430. If an idle processor is identified, executable instructions associated with the idle hand off mechanism execute to transfer the runnable thread directly to the idle processor without placing the runnable thread in a run queue by setting the value of a handoff state variable 315 to the handle of the runnable thread. However, according to some embodiments, when an idle processor is not identified, executable instructions, e.g., run queue mechanism instructions, execute to place the runnable thread in a run queue, e.g. a scheduler run queue 312 or a local run queue 314-1, 314-2, . . . , 314-P associated with one of a number of processors 304-1, 304-2, 304-P (FIG. 3).

Figure 5:
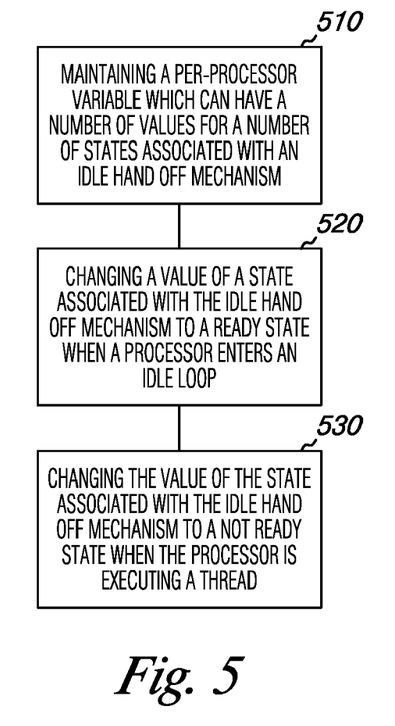
FIG. 5 is a process flow diagram of transferring threads according to another embodiment.

FIG. 5 illustrates a method embodiment for transferring threads comprising maintaining a per-processor variable, e.g., handoff state variable 315, which can have a number of values for a number of states associated with an idle hand off mechanism 317, as shown at 510. The idle hand off mechanism 317 comprises executable instructions for maintaining the per-processor variable. A processor can have an associated set of data and processing so that the processor is presented to executable instructions as an object, having "attributes" and "methods", similar to such understanding in the field of object oriented programming. In various embodiments, the per-processor variable may be expressed as processor_idle_handoff_state. By way of example, and not by way of limitation, the per-processor variable can have a number of values representing information selected from the group of: IDLE_HANDOFF_NOTREADY (indicating that a processor is not ready to receive a hand off of a runnable thread from the idle hand off mechanism, i.e., a "not ready" state); IDLE_HANDOFF_READY (indicating that a processor is ready to receive a hand off of a runnable thread from the idle hand off mechanism, i.e., a "ready" state); and an "Other Value" (e.g., a handle of a thread being handed off when a runnable thread is being handed off directly to an idle processor using the idle hand off mechanism). The per-processor variable may be represented as a flag expressed in digital form.

As shown at block 520, the method comprises changing a value of a state associated with the idle hand off mechanism to a ready state when the processor enters an idle loop. Further, as shown at block 530, the method comprises changing a value of a state associated with the idle hand off mechanism to a not ready state when the processor is executing a thread.

Thus, a processor is in IDLE_HANDOFF_NOTREADY state when the processor is executing a thread. According to the idle hand off mechanism, each processor, e.g., from among processors 304-1, 304-2, . . . , 304-P, updates its state to IDLE_HANDOFF_READY on entering an idle loop. Updating the state to IDLE_HANDOFF_READY indicates to the scheduler that the processor is ready to receive a direct handoff of a runnable thread through the idle hand off mechanism. Further, when an idle processor is looking for runnable threads in a run queue, the scheduler may change the value of the state associated with the idle hand off mechanism to a handle of a thread being handed off directly to the processor by the idle off mechanism while the processor is looking for runnable threads in a run queue.

According to the idle hand off mechanism, the idle processor can use the handle of the thread being handed off directly to the processor to select the runnable thread and to change the value of the state associated with the idle hand off mechanism to the not ready state. When a thread is ready to run, and an idle processor with an IDLE_HANDOFF_READY state is selected as a processor to which the runnable thread is to be assigned, instructions execute such that the scheduler hands off the thread to the selected processor by saving the thread's handle in the target processor processor_idle_handoff_state variable, e.g., as the Other Value. The processor_idle_handoff_state update can be performed using atomic instructions specific to the selected processor. Atomic instructions are instructions that are handled completely in a single operation of the processor. Atomic instructions ensure that more than one processor executing the scheduler instructions do not attempt to hand off runnable threads to the same selected processor. When an idle processor is in the process of selecting another thread from a non empty run queue while a direct thread hand off is occurring, the method includes selecting a thread based on one or more scheduling parameters, e.g., a scheduling priority.

Figure 6:
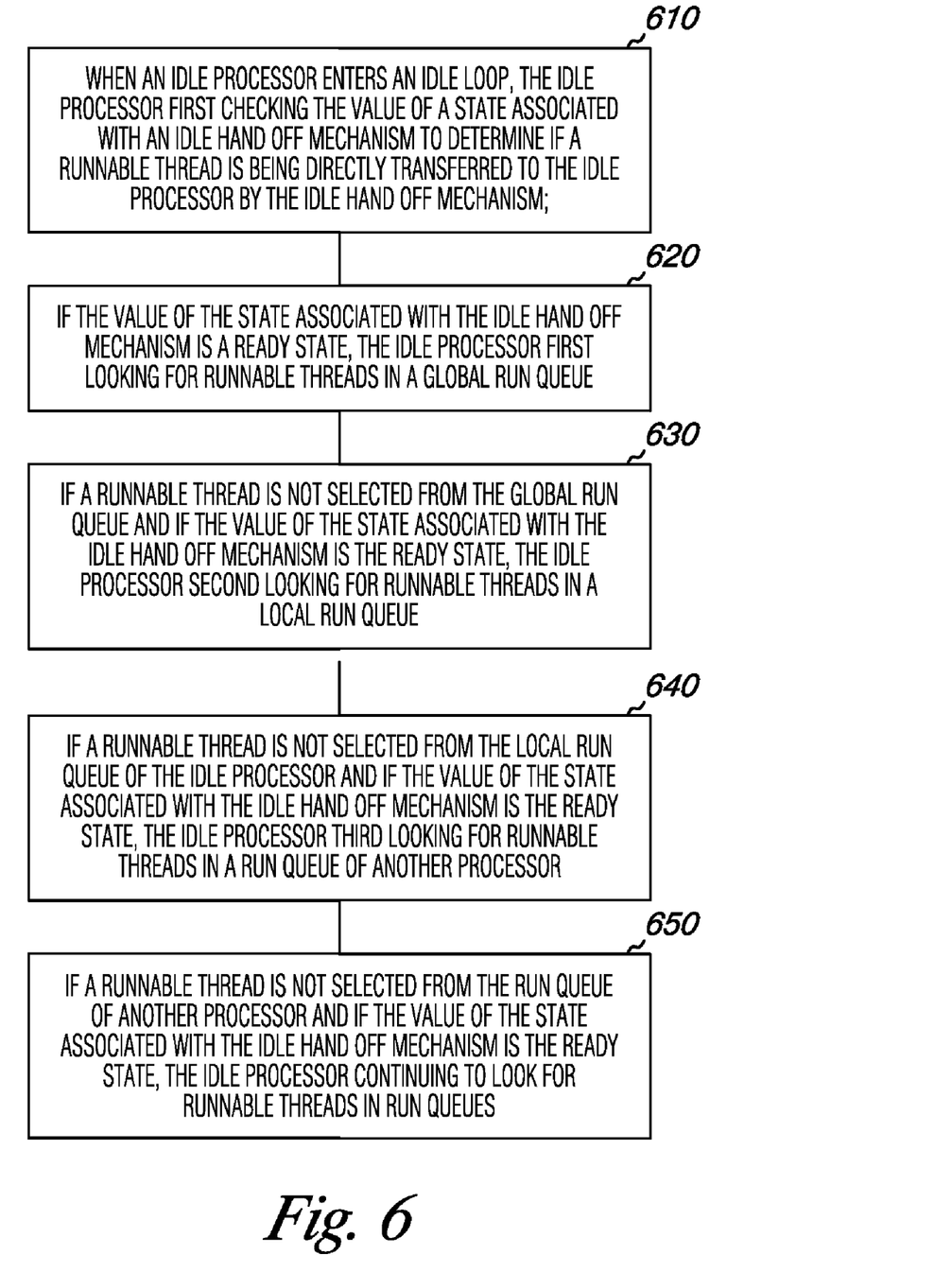
FIG. 6 is a process flow diagram of transferring threads according to another embodiment.

FIG. 6 depicts a method embodiment for transferring threads. As shown at 610, when an idle processor enters an idle loop, the method includes checking the value of a state associated with an idle hand off mechanism to determine if a runnable thread is being directly transferred to the idle processor by the idle hand off mechanism. As shown at 620, if the value of the state associated with the idle hand off mechanism is a ready state, the method includes the idle processor first looking for runnable threads in a global run queue and re-checking the value of the state associated with the idle hand off mechanism.

Thus, an idle processor in a loop looking for runnable threads to execute may notice that the handoff state variable 315 value associated with the per-processor variable, e.g., processor_idle_handoff_state, has changed from IDLE_HANDOFF_READY to some other value which is an indication that a direct thread hand off has occurred. If the idle processor has not selected a runnable thread from the global run queue, the idle processor will use the thread handle, e.g., represented as the Other Value in the processor_idle_handoff_state variable, to select the runnable thread associated with the idle hand off mechanism. Additionally, the instructions execute to change the state of the processor_idle_handoff_state variable to IDLE_HANDOFF_NOTREADY. The particular processor then proceeds to execute the thread.

Alternatively, the idle processor may be in the process of selecting another thread from a non-empty run queue, e.g., the global queue, while a runnable thread hand off is also occurring. In such cases, the method includes selecting a thread based on one or more scheduling parameters, e.g., selecting according to a scheduling parameter among the group of: a scheduling priority; a scheduling policy; a processor affinity; and/or a non uniform memory access affinity (NUMA), etc.

As shown at 630, if a runnable thread is not selected from the global run queue and if the value of the state associated with the idle hand off mechanism is the ready state, the method includes the idle processor second looking for runnable threads in a local run queue and re-checking the value of the state associated with the idle hand off mechanism.

An idle processor in a loop looking for runnable threads to execute will again notice whether handoff state variable 315 value associated with the per-processor variable, e.g., processor_idle_handoff_state, has changed from IDLE_HANDOFF_READY to some other value which, according to embodiments, is an indication that a thread hand off associated with the idle hand off mechanism has occurred. If the idle processor has not selected a runnable thread from the local run queue, the idle processor will use the thread handle, e.g., represented as the Other Value in the processor_idle_handoff_state variable to select the runnable thread associated with the idle hand off mechanism. Additionally, the executable instructions associated with the idle hand off mechanism execute to change the state of the processor_idle_handoff_state variable to IDLE_HANDOFF_NOTREADY. The particular process then proceeds to execute the thread.

If the idle processor is in the process of selecting another thread from a non-empty run queue, e.g., a local run queue, while a direct thread hand off is occurring, the method includes selecting a thread based on one or more scheduling parameters. Selecting the thread based on one or more scheduling parameters includes selecting according to a scheduling parameter among the group of: a scheduling priority; a scheduling policy; a processor affinity; and/or a non uniform memory access affinity (NUMA), etc.

As shown at 640, if a runnable thread is not selected from the local run queue of the idle processor and if the value of the state associated with the idle hand off mechanism is the ready state, the method includes idle processor third looking for runnable threads in a run queue of another processor and then re-checking the value of the state associated with the idle hand off mechanism.

Again, an idle processor in a loop looking for runnable threads to execute may notice that handoff state variable 315 value associated with the per-processor variable, e.g., processor_idle_handoff_state, has changed from IDLE_HANDOFF_READY to some other value which indicates that a direct thread hand off has occurred. If the idle processor has not selected a runnable thread from the run queue of another processor, the idle processor will use the thread handle to select the runnable thread. Additionally, instructions execute to change the state of the processor_idle_handoff_state variable to IDLE_HANDOFF_NOTREADY. The particular processor then proceeds to execute the thread. As before, if the idle processor was in the process of selecting another thread from a non-empty run queue, e.g., the run queue of another processor, while a direct thread hand off is occurring, the method includes selecting a thread based on one or more scheduling parameters.

As shown at 650, if a runnable thread is not selected from the run queue of another processor and if the value of the state associated with the idle hand off mechanism is the ready state, the method includes the idle processor continuing to look for runnable threads in run queues. Thus, for example, instructions can execute to cause the processor to repeat the sequence described in connection with blocks 610 through 650 until a runnable thread has been selected and commenced executing. When the state of the processor_idle_handoff_state variable for a given processor is changed to IDLE_HANDOFF_NOTREADY, the executable instructions prevent a runnable thread from being directly handed off to the given processor.

FIGS. 3-6 illustrate various embodiments for executable instructions that handle the transfer of threads according to the present disclosure. Computer executable instruction embodiments of the present disclosure can be performed by software, firmware, hardware, application modules, and the like. The embodiments can use program instructions resident on and/or executable by devices, systems, or networks shown herein or otherwise. The embodiments of the present disclosure are not limited to a particular operating environment or to instructions written in a particular programming language. Software, firmware, and/or processing modules, suitable for carrying out embodiments of the present disclosure, can be resident on one or more devices or in one or more locations.

Figure 1:
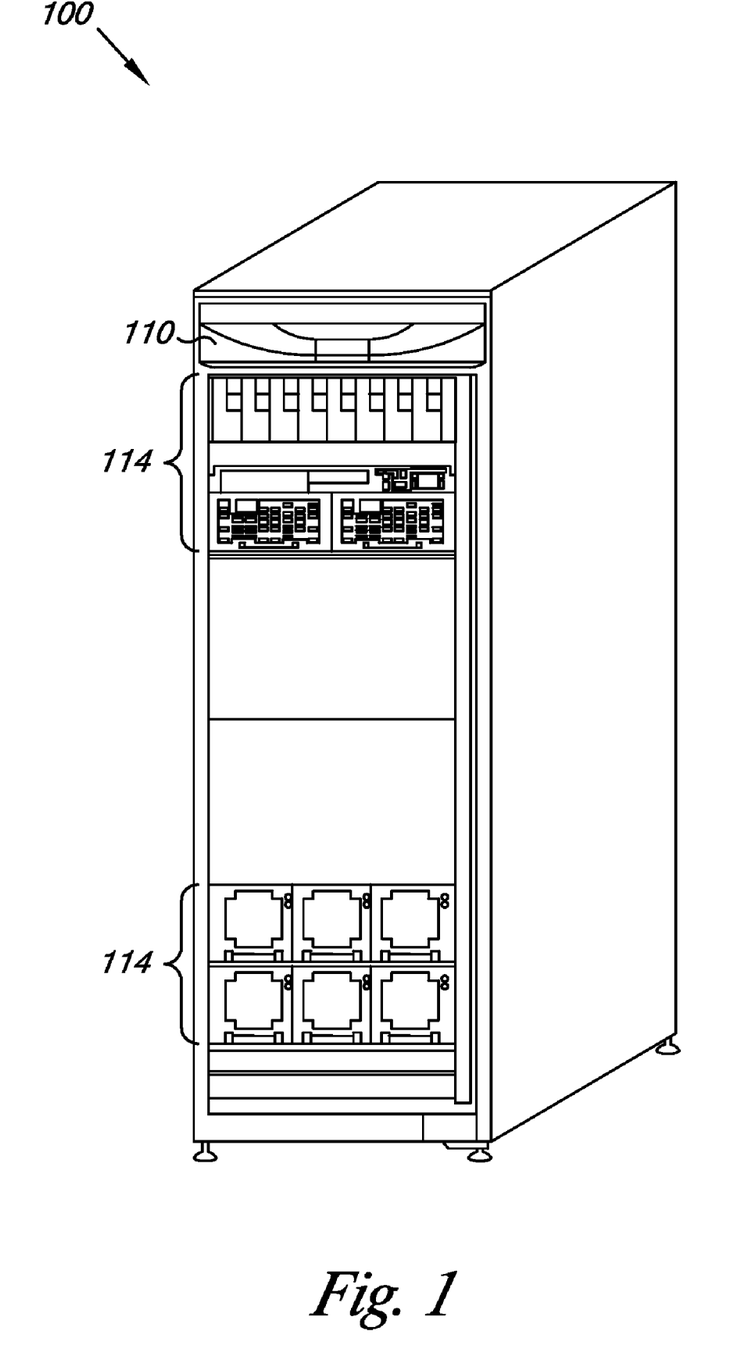
FIG. 1 is a high-level functional block diagram of a computing system.

FIG. 1 illustrates an example of a multiprocessor computing system 100 for handling threads. The multiprocessor computing system 100 includes a user control panel 110 and a number of input/output (I/O) components 114. The system further includes a number of processor and memory resources (as described in connection with FIG. 2) for operating on computer executable instructions. The multiprocessor computing system 100 can include a stand-alone computing device, such as desktop personal computer (PCs), workstation, server, etc., and/or may include a number of computing systems networked together over a local area network (LAN), wide area network (WAN), etc. Executable instructions can reside on various forms of computer readable mediums available to the multiprocessor computing system 100. In some embodiments, multiprocessor computing system 100 comprises a greater or lesser number of components.

Figure 2:
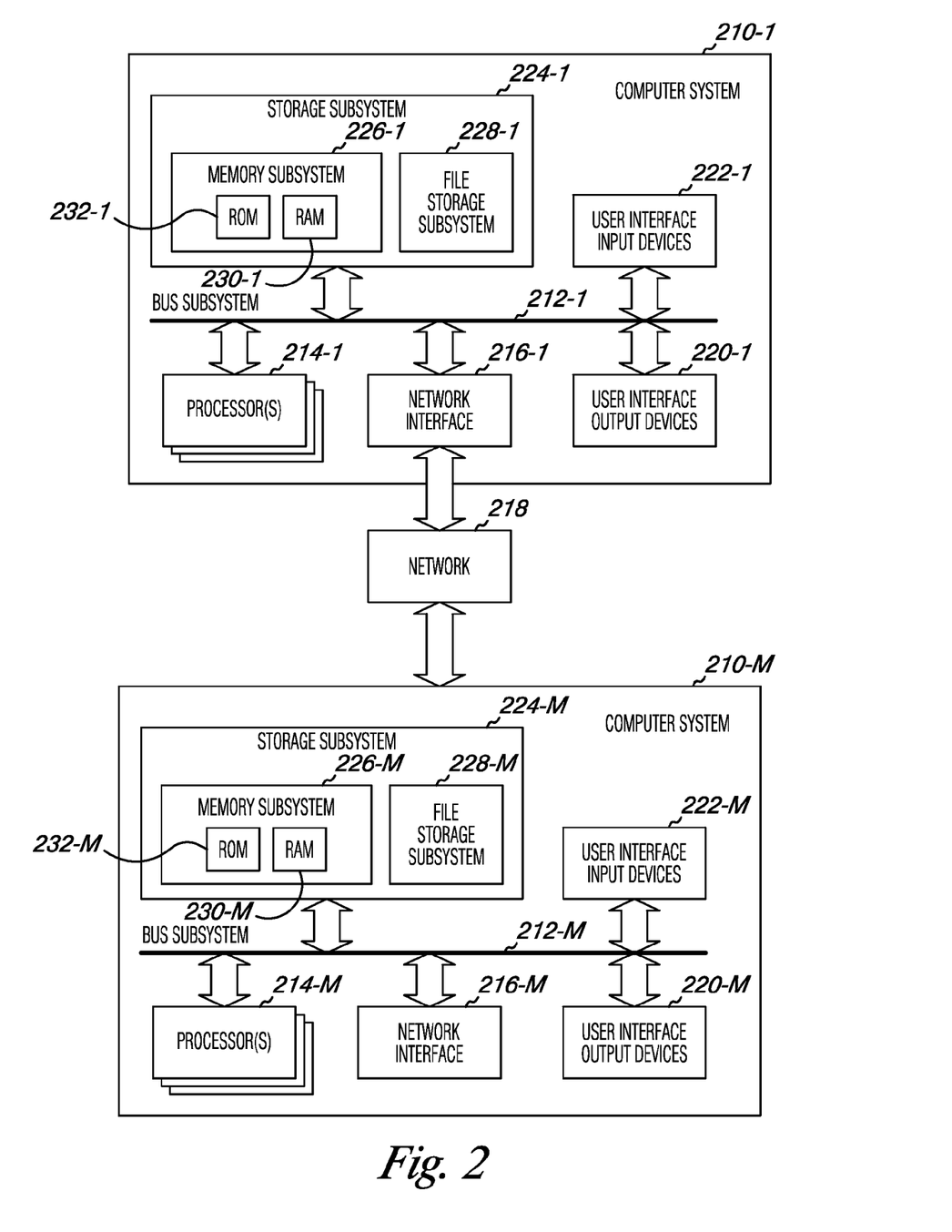
FIG. 2 is a block diagram of components of a computing system.

FIG. 2 illustrates example components of a number of computing systems, e.g., 210-1, ..., 210-M connected via a network 218. The computing systems, 210-1 and 210-M can include the system shown as 100 in FIG. 1. The designator "M" is used to indicated that a number of computing systems may be connected via a network 218. As shown in the embodiment of FIG. 2, the number of computing systems, e.g., 210-1, ..., 210-M, can include a number of processors, shown generally at 214-1 and 214-M. The multiprocessors of a given computing system, 210-1, ..., 210-M, can communicate with a number of other computing components via bus subsystems, e.g. 212-1 and 212-M. Bus subsystems, 212-1 and 212-M, provide mechanisms for letting the various components and subsystems of computer systems, 210-1 and 210-M, communicate with each other as intended. Although bus subsystems, 212-1 and 212-M, are shown schematically as single busses, embodiments of the bus subsystems, 212-1 and 212-M, may include multiple busses.

The other computing components illustrated include a storage subsystem, 224-1 and 224-M, having a memory subsystem, 226-1 and 226-M, and a file storage subsystem, 228-1 and 228-M, user interface input devices, 222-1 and 222-M, user interface output devices, 220-1 and 220-M, and a network interface subsystem, 216-1 and 216-M, to name a few. More or fewer of the component examples given above can be included in a particular computing system. For example, embodiments of the invention can be implemented in a multiprocessor or single processor system or computing device. Additionally, embodiments described herein can be implemented in a distributed computing network environment.

The input and output devices allow user interaction with computer systems, 210-1 and 210-M. Network interface subsystems, 216-1 and 216-M provide an interface to outside networks, e.g., network 218, which can include one or more local area networks (LANs), wide area networks (WANs), the Internet, and/or wireless networks, etc. That is, the network 218 itself may be comprised of many interconnected computer systems and communication links, etc. Communication links as used herein may be wired and/or wireless communication links, e.g., hardwire links, optical links, satellite or other wireless communications links, wave propagation links, or other mechanisms for communication of information.

Storage subsystems, 224-1 and 224-M, store the operating system "kernel" layer and an application layer to enable the computing system to perform various functions, tasks, or roles. File storage subsystems, 228-1 and 228-M, provide persistent (non-volatile) storage for additional program and data files, and may comprise a hard disk drive, a floppy disk drive along with associated removable media, a compact digital read only memory (CD-ROM) drive, an optical drive, or removable media cartridges. Memory subsystems, 226-1 and 226-M, comprise a number of memories including main random access memory (RAMs), 230-1 and 230-M, for storage of program instructions and data during program execution and read only memories (ROMs), 232-1 and 232-M, in which fixed instructions are stored. For example, operating systems (OSs) and basic input/output systems (BIOSs) are stored in ROMs, 232-1 and 232-M.

As mentioned above, the kernel layer of a computer system manages the set of processes that are running on the system by ensuring that each process is provided with processor and memory resources at the appropriate time. A process refers to a running program, or application, having a state and which may have an input and output. The kernel provides a set of services that allow processes to interact with the kernel and to simplify the work of an application writer. As used herein an operating system of a computer system can include a Unix, Linux, HP-UX, Windows, and/or Mac operating system, etc.

The memory subsystems, 226-1 and 226-M, include memory management systems, e.g., in RAMs 230-1 and 230-M. The memory management systems include programs, code, data, look-up tables, etc. Thus, the memory management systems within in memory subsystems, 226-1 and 226-M, include elements such as virtual memory data structures associated with various processes to support the management of memory in connection with program applications being executed by the processor(s), 214-1 and 214-M. Memory, including virtual memory, can be partitioned according to a memory management subsystem. The memory subsystems, 226-1 and 226-M, may also contain other programs and data, i.e., additional software.

The storage subsystems, 224-1 and 224-M, provide various computer readable medium. As used herein, a computer readable medium is intended to include the types of memory described above. Program embodiments as will be described further herein can be included with the computer readable medium described above and may also be provided using a carrier wave over a communications network such as the Internet, wireless RF networks, etc.

What is claimed is:

1. A method of transferring one or more threads, the method comprising:
    determining an idle processor in a plurality of processors by checking a handoff state variable of one or more of the plurality of processors prior to placing an identified runnable thread in a run queue, wherein the handoff state variable is set to at least one of a handoff ready state, a handoff not ready state, or a thread handoff state; and
    transferring the runnable thread to the determined idle processor by setting the handoff state variable of the idle processor to a handle of the runnable thread, wherein the handle of the runnable thread is a representation of an identifier for the runnable thread.

2. The method of claim 1, wherein determining the idle processor comprises determining the idle processor from the plurality of processors using a processor search algorithm.

3. The method of claim 1, wherein, if the idle processor is identified, further comprising transferring the runnable thread directly to the idle processor without placing the runnable thread in the run queue.

4. The method of claim 1, further comprising, if the idle processor is not determined, placing the runnable thread in the run queue.

5. The method of claim 1, further comprising maintaining a processor handoff state comprising one of a plurality of values for a plurality of states associated with at least one processor in the plurality of processors.

6. The method of claim 5, wherein the method comprises at least one of:
    setting the handoff state to a ready state if the idle processor enters an idle loop; and
    setting the handoff state to a not ready state if the idle processor is executing a thread.

7. The method of claim 5, further comprising
    changing a processor handoff state for a first processor in the plurality of processors to a handle of the runnable thread if the first processor is looking for runnable threads in the run queue.

8. The method of claim 7, further comprising:
    the first processor using the handle of the thread being transferred to select the thread; and
    changing the handoff state associated with the first processor to a not ready state.

9. The method of claim 8, wherein, if the idle processor is in a process of selecting a second thread from a non empty run queue while a thread transfer is occurring, further comprising selecting at least one of the runnable thread, the second thread, or a thread based on a scheduling parameter.

10. The method of claim 9, further comprising placing a one of the runnable thread or the second thread that was not selected for execution on the run queue.

11. A non-transitory computer readable medium having executable instructions stored thereon that, when executed, cause a machine to:
    maintain a per-processor variable which can have a plurality of values for a plurality of states associated with a plurality of processors, wherein the plurality of states includes a handoff ready state, a handoff not ready state, and a thread handoff state;
    identify a runnable thread; and
    transfer the runnable thread to a first processor in the plurality of threads, the processor being in an idle state as determined by checking the per-processor variable, transferring the runnable thread comprising setting the per-processor variable to a reference to the runnable thread, wherein the reference to the runnable thread is a representation of an identifier for the runnable thread.

12. The non-transitory computer readable medium of claim 11, wherein the executable instructions, when executed, further cause the machine to:
    change a value of the per-processor variable associated the first processor to a ready state when the first processor enters an idle loop; and
    change the value of the per-processor variable associated the first processor to a not ready state when the first processor is executing a thread.

13. The non-transitory computer readable medium of claim 12, wherein, if the first processor is in a process of selecting another thread from a non-empty run queue while a thread transfer is occurring, the executable instructions cause the machine to select a one of the runnable thread or the another thread based on a scheduling parameter.

14. The non-transitory computer readable medium of claim 13, wherein the machine readable instructions, when executed, further cause the machine to select the thread based on a scheduling parameter, the scheduling parameter comprising at least one of:
- a scheduling priority;
- a scheduling policy;
- a processor affinity; and
- a non-uniform memory access affinity.

15. A system comprising:
- a plurality of processors;
- a memory in communication with at least one of the processors;
- a scheduler, including a run queue mechanism, in communication with at least one of the plurality of processors; and
- computer executable instructions storable in memory and executable on at least one of the processors to:
  - maintain a per-processor variable which can have a plurality of values for a plurality of states associated with a first processor in the plurality of processors, wherein the plurality of states includes a handoff ready state, a handoff not ready state, and a thread handoff state;
  - change a value of a state associated with the first processor to a ready state when a first processor enters an idle loop;
  - identify a runnable thread received by the scheduler;
  - identify an idle processor among the processors; and
  - transfer the runnable thread to the idle processor by setting the value of a state associated with the idle processor to a reference to the runnable thread, wherein the reference to the runnable thread is a representation of an identifier for the runnable thread.

16. The system of claim 15, wherein the instructions further comprise instructions executable to:
- when the idle processor is not identified, place the runnable thread in the run queue;
- when the idle processor enters the idle loop, cause the idle processor to first check the value of the state associated with an idle hand off mechanism to determine if a runnable thread is being directly transferred to the idle processor by the idle hand off mechanism;
- if the value of the state associated with the idle hand off mechanism is a ready state, cause the idle processor to look for runnable threads in a run queue; and
- change the value of the state associated with the idle hand off mechanism to a handle of a thread being handed off directly by the idle off mechanism while the idle processor is looking for runnable threads.

17. The system of claim 15, wherein the instructions further comprise instructions executable to:
- select a thread based on a scheduling parameter, if the idle processor is selecting another thread from a run queue during a thread transfer.

18. The system of claim 17, wherein the scheduling parameter is selected from among a group comprising:
- a scheduling priority;
- a scheduling policy;
- a processor affinity; and
- a non-uniform memory access affinity.

* * * * *